United States Patent
Schönfeld

(10) Patent No.: US 6,520,012 B1
(45) Date of Patent: Feb. 18, 2003

(54) PROCESS AND DEVICE FOR UNBALANCE CORRECTION

(75) Inventor: Harald Schönfeld, Darmstadt (DE)

(73) Assignee: Schenck Rotec GmbH (DE)

( * ) Notice: Subject to any disclaimer, the term of this patent is extended or adjusted under 35 U.S.C. 154(b) by 0 days.

(21) Appl. No.: 09/642,368

(22) Filed: Aug. 21, 2000

(30) Foreign Application Priority Data

Aug. 26, 1999 (DE) .......................... 199 40 469

(51) Int. Cl.$^7$ ................................ G01M 1/34
(52) U.S. Cl. ...................................... 73/462
(58) Field of Search .................. 73/460, 462, 471, 73/472, 473, 474, 475, 476, 477, 478, 479; 409/165, 162, 166, 189, 191

(56) References Cited

U.S. PATENT DOCUMENTS

| | | | | |
|---|---|---|---|---|
| 4,803,882 A | * | 2/1989 | Schonfeld et al. | ............. 73/462 |
| 5,199,992 A | * | 4/1993 | Hines et al. | ................. 118/669 |
| 5,871,314 A | * | 2/1999 | Trionfetti | ..................... 73/462 |

FOREIGN PATENT DOCUMENTS

| | | | |
|---|---|---|---|
| DE | 26 38 876 | | 3/1978 |
| DE | 4229521 | * | 3/1994 |
| DE | 42 29 521 | | 3/1994 |
| JP | 05215634 | | 8/1993 |
| JP | 5-215634 | * | 8/1993 |

* cited by examiner

Primary Examiner—Helen Kwok
(74) Attorney, Agent, or Firm—Connolly Bove Lodge & Hutz LLP

(57) ABSTRACT

A process and device corrects an ascertained unbalance on a rotor (1) that has equidistantly arranged sites along a rotor circumference for an unbalance correction by means of material removal. Correction tools (5,5') arranged at a fixed distance from each other are provided, and the correction tools (5,5') can be positioned crosswise to the rotor axis (10) by a movement between the rotor (10) and the correction tools (5,5') in the tangential direction resulting from the ascertained rotor unbalance. For purposes of material removal, the correction tools (5,5'), are moved, at least in the radial direction between the rotor (10) and the correction tools (5,5'), into the rotor (1) by a movement resulting from the ascertained rotor unbalance. In order to carry out an unbalance correction in one single work step using the simplest possible set-up, just two correction tools (5,5') are provided. During the unbalance correction, the correction tools (5,5') are always made to engage jointly with the rotor (1), and the correction tools (5,5') generate correction components that run essentially towards each other at the angle of a whole-number multiple of the correction site division.

13 Claims, 1 Drawing Sheet

PROCESS AND DEVICE FOR UNBALANCE CORRECTION

BACKGROUND OF THE INVENTION

The present invention relates to a process for correcting an ascertained unbalance on a rotor, and to a device for this purpose.

When rotors are balanced, first of all, their unbalance is ascertained in an unbalance measuring machine or balancing machine. The unbalance is generally related to one or more correction planes and determined on the basis of magnitude and angular position. Consequently, a polar unbalance correction is possible. If the unbalance correction on rotors can only be carried out at certain sites distributed along the circumference, the correction is carried out at sites that are suitable for that purpose in components of the correction vector. In the case of armatures for electric machines, these are the pole shoes that are connected by webs to the armature core and between which the copper wire windings are located. In this process, the pole shoes should be weakened as little as possible and, in particular, milling through or grinding down to the windings should be avoided under all circumstances. Moreover, the component correction should be carried out in a angle work step at the sites suitable for this purpose.

A process and a device of the type mentioned above are known from DE 42 29 521 A1. Here, the component correction is carried out on an electric armature in a single work step. This familiar process uses three correction tools mounted on a tool spindle. For purposes of removing material, they are moved linearly in the axial direction of the tool spindle as well as tangentially to the rotor, depending on the unbalance, and they are also moved linearly in the radial direction in order to advance into the rotor. With this known process, the rotor is turned to such an extent that the middle axis of the pole shoe from which the greatest correction mass is to be removed is aligned with the middle of the three correction tools. Before the correction procedure is carried out, the correction tools with the tool spindle are moved tangentially by a path determined on the basis of the ascertained unbalance that is to be corrected. The rotor follows the correction tools by being continuously related around its axis by a calculated angle that corresponds to the movement path and to the movement direction of the middle correction tool. Subsequently, for purposes of the unbalance correction, the correction tools are moved along a linear path radially to the rotor so that the correction tools carry out the material removal at a calculated penetration depth. A drawback of the prior art process is that the rotor has to follow the movement of the correction tools by being rotated around its axis.

SUMMARY OF THE INVENTION

Accordingly, one of the objectives of the present invention is a process and a device of the type mentioned above for the correction of an ascertained unbalance, whereby a precise unbalance correction is carried out in one single work step using the simplest possible set-up.

The present invention has the advantage that it is not necessary for the rotor to follow by being turned around its axis, so that the set-up of the device and the execution of the process are considerably simplified. The rotor armature during the component correction in two machining steps, remains in a position corresponding to the division. This is especially advantageous when the unbalance measurement and the unbalance correction are carried out on different machines or in different stations of a unit, since the rotor only has to be placed in one of its positions corresponding to the division and a continuous turning into machining positions is not necessary. Consequently, a turning device for this purpose is not necessary. According to the invention, the angular position setting of the correction unbalance is carried out by just two correction tools, so that a third correction tool located between them is not necessary for this purpose and, at most, can be provided in order to influence the magnitude of the correction unbalance. It has proven to be especially advantageous that the angular position setting can be achieved over a large angle range corresponding to the division by means of small tangential movement paths of the correction tool set. The slanted advancing of the correction tools leads to a larger carriage length and thus to better utilization of the available pole shoe material. Furthermore, when the pole shoe between the correction tools is not being machined, if necessary, a second correction step is easily possible. Leaving this pole shoe free advantageously opens up the possibility of supporting the rotor on at least this pole shoe or of using this pole shoe for alignment of the rotor corresponding to the division in the lock-in positions defined by the number of pole shoes.

In an advantageous embodiment of the invention, the correction tools advance into the rotor to about the middle with respect to the correction sites, whereby at the maximum advancing depth, the machining profile lies in the middle relative to the web axis. In this manner and through the slanted advancing, for example, at 45°, the appertaining correction site, e.g. a pole shoe of an electric armature, is weakened as little as possible.

According to the invention, another embodiment provides that the correction components correct an unbalance vector that lies within an angle range corresponding to a correction site division. The angle range extends on both sides of a possible correction site or on both side of a middle plane between two possible correction sites. With an even number as well as with an odd number of intermediate possible correction sites, only one rotation of the rotor corresponding to the division around a lock-in position is needed each time when the unbalance vector to be corrected lies adjacent to the indicated angle range. The invention can be used for an even and an odd number of correction sites of the rotor.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawing wherein similar reference characters refer to similar parts and in which.

DETAILED DESCRIPTION OF THE INVENTION

Figure 1:
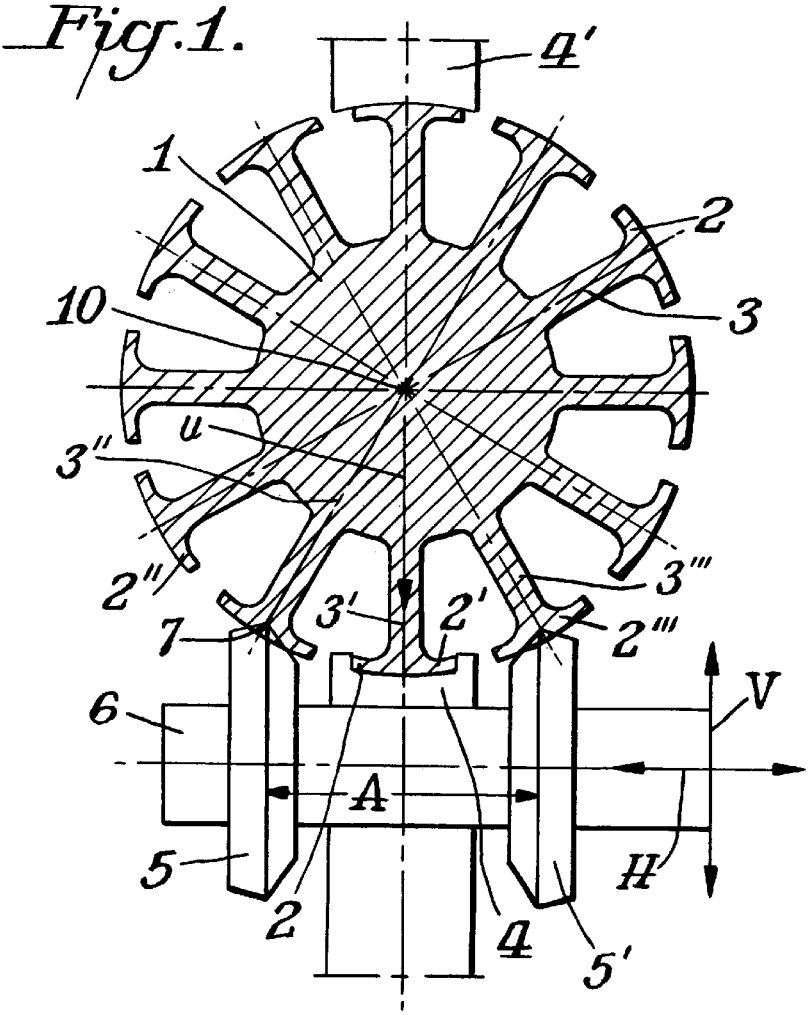
FIG. 1 is a schematic representation of a device for unbalance correction on a 12-pole rotor in which the unbalance U to be corrected runs in the web axis of a pole shoe.

In FIG. 1, the armature of an electric machines is shown as the rotor 1 in the form of a cross section through a correction plane. However, the invention can be used for any rotor that has equidistantly arranged sites along a rotor circumference for purposes of an unbalance correction by means of material removal such as, for example, profiled shafts or rotors with radial projections like paddles or vanes. The invention, however, can also be used for rotors with smooth circumference surfaces in the correction plane(s). The armature has twelve pole shoes 2 that are connected to the armature core by webs 3. The copper wire windings (not shown) of the armature are arranged in the areas between the pole shoes 2 and the webs 3. The pole shoes 2 are the possible correction sites of the rotor.

In the embodiment shown in FIG. 1, the rotor 1 has an unbalance U to be corrected that lies in the middle plane of the lowemost web 3' between the armature core and the pole shoe 2' and that faces downwards. For purposes of the unbalance correction, the rotor 1 is affixed by means of the pole shoe 2' and the diametrically opposed pole shoe by means of a holder. The holder has two holding elements 4,4' of which the lower holding element 4 holds the rotor 1 in a lock-in position defined by the division into twelfths. The rotor can be affixed in a lock-in position as well as supported using means that are customarily present in balancing machines.

The unbalance correction is carried out by the removal of material from the pole shoes 2'' and 2''', which are located to the left and right of pole 2'. However, it is also possible to select two pole shoes that are separated by two or more pole shoes between them.

In order to remove material from pole shoes 2'' and 2''', there are two correction tools 5,5' that are at a fixed distance from each other on a tool spindle 6. The correction tools 5,5' can be, for example, disk milling cutters or grinding disks for purposes of material removal that rotate around the spindle axis, for instance, by means of the driven tool spindle 6. The axial distance of the correction tools 5,5' is essentially determined by the middle distance of the pole shoes 2'',2''' selected for the correction which, in the example of FIG. 1, is the distance A. At the maximum advancing depth, the machining profile should lie centered with respect to the web axis. At the distance A, the correction tools each have the tip of an essentially triangular machining profile 7,7' that is also selected with regard to the shape of the pole shoe, taking the transition of the web into account. The tip can be flattened so that as much material as possible can be removed near to the surface. The triangular shape is selected for this in such a way that the middle plane of the web divides the angle of the machining triangle tip approximately in half, since this makes it possible to achieve a maximum radial machining depth by the machining profile 7,7', which is tapered in the radial direction. The angle at the tip of the triangle is preferably in the range between 90° and 120°, depending on the selection and configuration of the pole shoe and of the transition of the web. With the selected machining profile, it is possible to remove as much material as possible close to the surface.

The tool spindle 6 in the example shown is arranged below the rotor 1 with a horizontal alignment. However, if necessary, the entire device for unbalance correction can be arranged so that it can be swiveled by any desired angle, e.g. by 90°, around the rotor axis 10. The tool spindle 6 can be moved continuously in at least two directions, namely, in direction H tangentially to the rotor 1 and crosswise to the rotor axis 10, and thus in the horizontal plane, and in the direction V, namely, radially and thus in the vertical plane.

A movement in the third coordinate direction, namely, parallel to the rotor axis 10, which is provided for if desired, allows the removal of additional material by extending the machining slit parallel to the rotor axis 10 towards both sides of the correction plane.

The drive for moving the tool spindle 6 can also be operated electrically, hydraulically or by means of other known drive mechanisms.

Instead of moving the tool spindle 6, the rotor 1 can be moved. It can also be provided that the tool spindle 6 and the rotor 1 execute movements.

In order to correct the unbalance U shown in FIG. 1, the tool spindle 6 is not moved in the horizontal or tangential direction and consequently, it is located in the depicted symmetrical position with the tips of the correction tools 5,5' each at a distance of A/2 from the middle plane of the web 3'. The advancing depth of the correction tools 5,5' is determined by an evaluation means (not shown) on the basis of the unbalance U to be corrected and on the basis of the specific relationships of the rotor 1 and the machining profile of the correction tools 5,5'. The tool spindle 6 is moved by the corresponding path in the vertical direction V for purposes of material removal.

The situation with an unbalance that does not run in the middle plane of a web 3 is explained below with reference to FIG. 2. For the sake of clarity, a rotor 1 with eight pole shoes 2, that is to say, with an angle or correction site division of 45°, is shown. The ascertained unbalance in the example presented can lie in the angle range indicated by the two differently broken lines a, b, whereby the angle α of this angle range corresponds to one division of the rotor 1 and is thus 45°. Lines a and b, and thus the angle range, lie symmetrically to the middle plane of the web 3'. If the unbalance lies outside of this angle range, then before the correction, the rotor 1 must be relocated through incremental turning by one or more correction site divisions into the suitable lock-in position in which the unbalance then lies within the angle range around the middle plane of the rotor web that is then facing downwards, but on whose pole shoe no correction is carried out.

Figure 2:
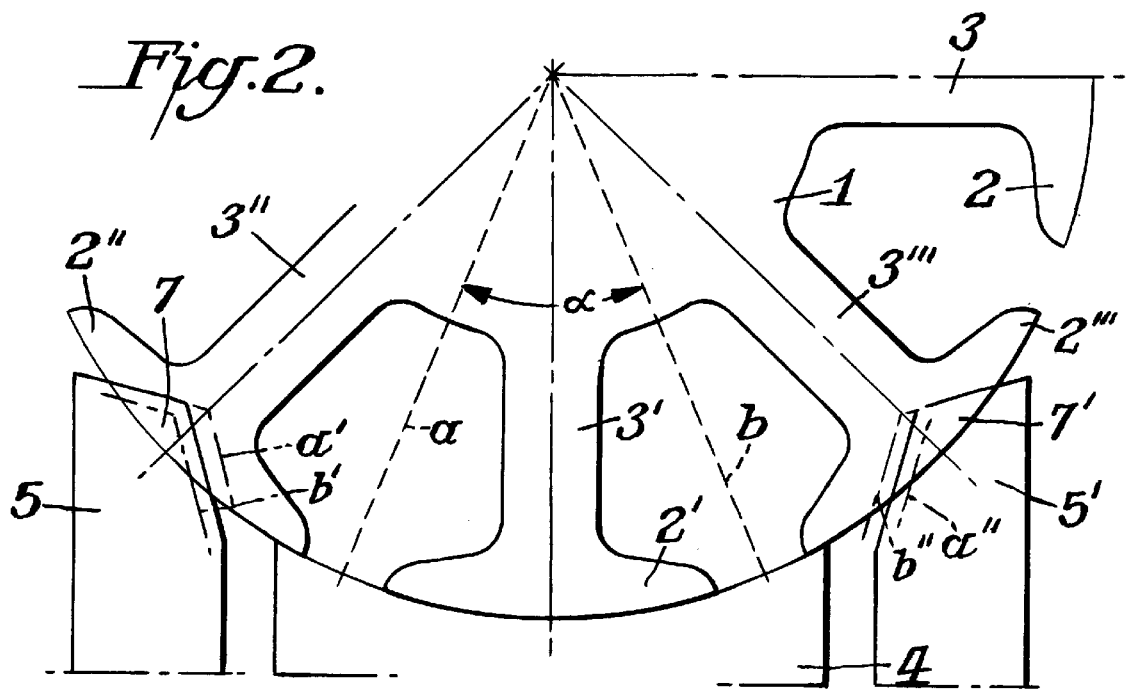
FIG. 2 is a schematic representation of a rotor with eight possible correction sites.

In FIG. 2, the correction tools 5 and 5' are indicated in three different positions. The solid line show the axial and radial positions of the correction tools 5 and 5' with which an unbalance running in the middle of the web 3' is corrected. An unbalance that runs in the direction of the broken line a can be corrected with the correction tools 5 and 5' in the axially and radially moved position a',a'' in which the correction tool 5 on the pole shoe 2'' of the web 3'' removes more material when it is moved to a' than the correction tool 5' on the pole shoe 2''' does when it is moved into the position a''. An unbalance that runs in the direction of the broken line b with the shorter dashes can be corrected with the correction tools 5 and 5' in the axially and radially moved position b',b''. In all of the depicted positions and in all of the intermediate positions of the correction tools 5 and 5', both correction tools 5 and 5' are engaged. The tip of the machining profile 7,7' of the more deeply advancing correction tool 5 or 5' lies in the middle plane of the appertaining web 3'', 3''' when it is at the maximum advancing depth. The angle at the tip of the machining profile 7,7' in the example shown is about 120° and, if necessary, can be selected up to about 160°, and it is consequently larger than the angle of the machining tip of about 90° that is selected for the rotor that is divided into twelfths according to FIG. 1. The angle range at the tip of the machining profile 7,7' extends approximately symmetrically to the middle plane of the web 3'',3'''. The maximum tangential movement of the correction tools 5,5' into position a',a'' or into position b',b'' in the example shown corresponds to about ¼ of the maximum advancing depth in the web direction.

Another embodiment (not shown) is one where, with a rotor that is divided into twelfths as shown in FIG. 1, there are two pole shoes located between the pole shoes on which the correction is to be carried out instead of only one pole shoe. The rotor is affixed corresponding to the division in a position in which the middle plane between two pole shoes points downwards. This arrangement also achieves an angle range corresponding to the division in which the unbalance to be corrected can lie, that is to say in the case of a rotor with 12 correction sites. In an angle range of 30° between two adjacent webs.

The invention also comprises arrangements in which the material removal takes place on immediately adjacent correction sites. However, in this case, an unbalance correction range of one division only exists if just one of the two correction tools takes over the material removal if the ascertained unbalance migrates to an unbalance borderline position in the middle plane of a web, while the other correction tool does not engage at the other correction site, in this case of an unbalance in the unbalance borderline position in the middle plane.

What is claimed is:

1. A process for correcting an ascertained unbalance on a rotor having equidistantly arranged sites for an unbalance correction by means of material removal along a rotor circumference, comprising the steps of providing correction tools arranged at a fixed distance from each other, positioning the correction tools on opposite sides of the rotor axis, effecting movement between the rotor and the correction tools in a tangential direction resulting from the ascertained rotor unbalance, effecting movement between the rotor and the correction tools at least in a radial direction for moving the correction tools into the rotor by a movement between the rotor and the correcting tools resulting from the ascertained rotor unbalance, providing just two correction tools, using just two correction tools during the unbalance correction, jointly engaging the correction tools with the rotor whereby the correction tools generate correction components that run essentially towards each other at an angle of a whole-number multiple of a correction site division.

2. A process of correcting an ascertained unbalance on a rotor having equidistantly arranged sites for an unbalance correction by means of material removal along a rotor circumference, comprising the steps of providing correction tools arranged at a fixed distance from each other, positioning the correction tools on opposite sides of the rotor axis, effecting movement between the rotor and the correction tools in a tangential direction resulting from the ascertained rotor unbalance, effecting movement between the rotor and the correction tools at least in a radial direction for moving the correction tools into the rotor by a movement between the rotor and the correcting tools resulting from the ascertained rotor unbalance, providing just two correction tools, using preferably two correction tools during the unbalance correction preferably jointly engaging the correction tools with the rotor whereby the correction tools generate correction components that run essentially towards each other at an angle of only one correction site division, and wherein at least one correction component is unequal zero.

3. A process according to claim 1 wherein the rotor is affixed in a lock-in position defined by the correction site division during correction.

4. A process according to claim 3 including using an intermediate correction site to hold the rotor.

5. A process according to claim 2 wherein the rotor is affixed in a lock-in position defined by the correction site division during correction.

6. A process according to claim 1, wherein the advancing of the correction tools into the rotor occurs approximately in the middle relative to the correction sites.

7. A process according to claim 1, wherein the correction components correct an unbalance vector that lies within an angle range of one correction site division whereby the angle range extends on both sides of a possible correction site if n is an even number or on both sides of a middle plane between two possible correction sites if n is an odd number, and wherein n is the number of correction sites located between the correction sites on which the correction is to be carried out.

8. A process according to claim 2 wherein the correction components correct an unbalance vector that lies within an angle range of one correction site division whereby the angle range extends between two adjacent correction sites on which the correction is to be carried out.

9. A device for correcting an ascertained unbalance on a rotor having equidistantly arranged sites along a rotor circumference for an unbalance correction by means of material removal, a holder for the rotor, correction tools arranged at a fixed distance from each other, means for moving the rotor and the correction tools in tangential and radial directions relative to one another, and wherein just two correction tools are provided arranged with respect to each other at a distance essentially corresponding to a whole-number multiple of a correction site division.

10. A device for correcting an ascertained unbalance on a rotor having equidistantly arranged sites along a rotor circumference for an unbalance correction by means of material removal, a holder for the rotor and correction tools arranged at a fixed distance from each other, means for moving the rotor and the correction tools in tangential and radial directions relative to one another, and wherein just two correction tools are provided arranged with respect to each other at a distance corresponding essentially to the correction site division.

11. A device according to claim 9, wherein the holder for affixing the rotor has a lock-in position corresponding to the division.

12. A device according to claim 11, wherein the holder includes holding elements and at least one of the holding elements of the holder is associated with at least one possible correction site.

13. A device according to claim 9, wherein the holder includes at least one holding element configured as a thrust bearing.

* * * * *